ANALOG MULTIPLIER

Filed Sept. 23, 1964

INVENTOR
MARK E. CONNELLY
BY,
Martin M. Santa
ATTORNEY

United States Patent Office
3,384,739
Patented May 21, 1968

3,384,739
ANALOG MULTIPLIER

Mark E. Connelly, Concord, Mass., assignor to Massachusetts Institute of Technology, Cambridge, Mass., a corporation of Massachusetts Filed Sept. 23, 1964, Ser. No. 398,710
5 Claims. (Cl. 235—194)

This invention relates to an electronic analog multiplier and in particular to a multiplier which provides multiplication by electro-optically controlled variable resistors.

Many methods of multiplication of electrical analog signals have been devised. These methods include mechanical, electronic, electro-mechanical and thermal means. The most frequently employed multipliers for D.C. analog computers are servo-driven potentiometers, time division multipliers, and quarter square multipliers. In general, these multipliers provide high accuracy and good frequency response with the disadvantage that they are relatively expensive. Where somewhat less accuracy and frequency response are adequate, the relatively inexpensive circuit of this invention has been found desirable.

For example, accuracies of 0.3% of full scale have been obtained with this multiplier, as compared with the static accuracies of .01% obtainable with servo-driven potentiometer multipliers and .02% obtainable with commercial quarter-square multipliers. As with the servo multiplier, the master multiplier input of the photoresistive multiplier is limited to signal frequencies below 10 cycles per second, but since the multiplicand merely excites a resistive dividing network, the frequency of this signal can extend into the kilocycle range. Commercial quarter-square multipliers are available in which both the multiplier and multiplicand can be in the kilocycle range.

It is, therefore, an object of this invention to provide an inexpensive electronic electrical analog multiplier which has accuracy and frequency response adequate for many applications.

The servo-driven potentiometer multiplier is capable of performing many independent multiplications with a common multiplier X by causing the position of the potentiometer arm to be a function of the common multiplier X while the inputs to the individual potentiometers are allowed to be independent multiplicands Y, Y′, Y″ . . ., whereby independent products XY, XY′, XY″ . . . are obtained. The bulk and cost of the servo-driven multiplier restricts its usefulness.

The quarter-square multiplier is an all-electronic circuit which in the most common configurations requires three or four operational amplifiers to fully implement. In addition, each quarter-square multiplier is capable of providing only one product so that the multiplier must be duplicated in all its elements, even though a large number of products having a common multiplier may be desired. Moreover, no saving in equipment is effected when two-quadrant instead of four-quadrant multiplication is required.

It is, therefore, a further object of this invention to provide a solid-state all-electronic multiplier which is capable of providing a plurality of independent products at its output terminals, which products correspond to individual multiplicands and a common multiplier.

It is a further object of this multiplier to provide an appreciable reduction in the number of operational amplifiers required compared to the number required by conventional all-electronic analog multipliers, both for four-quadrant and two-quadrant multiplication.

It is a feature of this invention that the multiplier, when used with two or more multiplicands, has essentially infinite isolation between the multiplicands and their resultant products. This is accomplished in the present invention by coupling the common multiplier function to the individual multiplicands by radiant energy, which in the preferred embodiment is in the visible light spectrum.

Various other objects and features of the invention will become apparent from the following specification, appended claims and accompanying drawings wherein:

The analog multiplier of this invention provides multiplication by having one input variable voltage control the resistance of an element in an electrical network, while the other input variable voltage is provided as an input to the electrical network, whereby the voltage at a terminal of the electrical network is affected by said variable resistance element and said other input voltage to provide a quantity proportional to the product of the two input voltages. More specifically, the electrical network may be a voltage divider circuit in which one series element is the variable resistor in the form of a photoconductive cell. The illumination on the photo-conductive cell is controlled to cause the cell's resistance to vary as a function of the electrical voltage of one input signal voltage. The electrical voltage of the second input signal is applied across the terminals of the voltage divider with the output product obtained at a terminal of the variable resistor.

Figure 1:
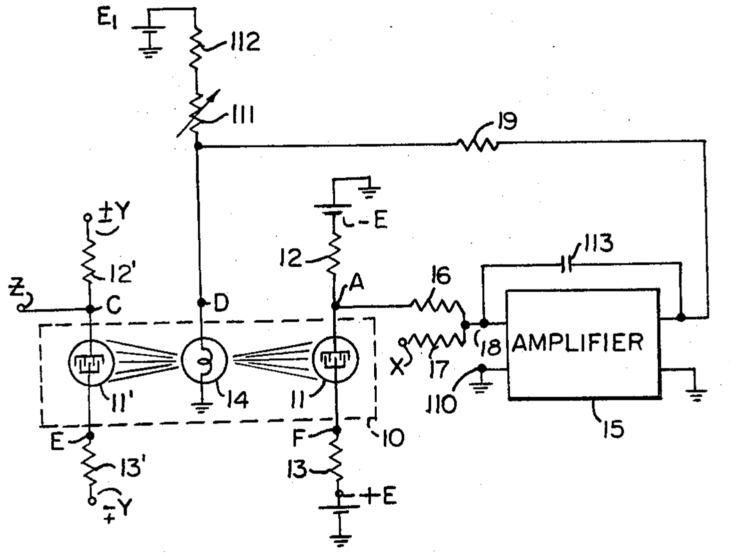
FIGURE 1 is a schematic drawing of a preferred embodiment of the electro-optical multiplier.

A preferred embodiment of the invention is shown in FIGURE 1. An incandescent lamp 14 energized by operational amplifier 15 illuminates a photoconductive cell 11. The cell 11 is connected as an element in a series voltage divider circuit comprising resistors 12, 13, photoresistor 11 and constant voltage sources +E and −E. The voltage $V_A$ at terminal A of the voltage divider is compared with the voltage $V_X$ at terminal X which is one of the input voltages to be multiplied. The particular comparison network of FIGURE 1 is a conventional summing circuit comprising resistors 16, 17. The voltage appearing at terminal 18 of the comparison network is applied as one input to amplifier 15. Amplifier 15 is a high-gain, direct-coupled amplifier commonly known as an operational amplifier. The other input terminal 110 of amplifier 15 is connected to a reference potential which in this case is chosen to be ground potential. Since amplifier 15 is a high gain circuit, the difference in potential at its two input terminals 18, 110 must be small if operation within the dynamic range of its output is to be achieved. Therefore, the voltage at terminal 18 will be very nearly at ground potential for those values of $V_X$ for which undistorted multiplication is to occur. The output of amplifier 15 provides a current through resistor 19 to lamp 14. The lamp 14 thus provides a controlled amount of illumination to impinge upon photoconductive cell 11 to thereby cause its resistance to have a value such that the voltage divider circuit will provide the desired voltage at terminal A.

Since terminal 18 must be near zero voltage for linear operation, the feedback circuit described in the previous paragraph must provide a voltage at terminal A which is opposite in polarity and very nearly equal to the voltagt at terminal X if resistors 16, 17 are equal. If they are unequal, the ratio of voltages at terminals A and X, $V_A/V_X$, will be in the ratio of resistance 16 to resistance 17. Typically, if the applied voltage at terminal X assumes values between plus and minus 10 volts and resistances 16 and 17 are 200 kilohms and 2 megohms respectively, the voltage at terminal A must assume corresponding values between minus and plus one volt.

In order to use the full dynamic range of amplifier 15 and thus allow the maximum range of voltage input at terminal X, the resistor 111 is adjusted to cause amplifier 15 to provide zero output voltage when terminal X is grounded. This, of course, means that the resistance of cell 11 has been caused to assume a value such that the voltage at terminal A is also at ground potential.

Variable resistor 111 and fixed resistor 112 are connected to an appropriate direct current power supply $E_1$ to provide the necessary current to lamp 14. For a 10 volt supply, resistors 111, 112 value of 100 ohms each has been found to provide convenient control of the current in a lamp type 338.

For reasons to be given later, cell 11 is restricted in its allowable resistance range. Amplifier 15 should be capable of supplying current to lamp 14 which will cause cell 11 resistance to vary over as great a portion of this resistance range as possible while still staying within the amplifier 15 allowed dynamic range. The value of resistance of cell 11 when input voltage at terminal X is at ground should be approximately the midpoint of the cell 11 resistance obtained at positive and negative saturation points of amplifier 15. Resistors 12, 13 are selected to satisfy this criteria. Typically, for a cadmium sulfide cell of the Clairex Corporation type CL605L, values of resistors 12, 13 of 57.6 and 86.6 kilohms for E of 10 volts has been found satisfactory where the operational amplifier is a Nexus Corporation type SGL-8 operated with a 15 volt supply and where resistor 19 is 680 ohms. Capacitor 113, 0.02 microfarad, is inserted to provide an integrating circuit which stabilizes the feedback network in accordance with well-established practice.

The portion of FIGURE 1 thus far described has concerned itself with a feedback circuit which is capable of causing the resistance of cell 11 to vary as a function of the applied voltage $V_X$. The voltage at terminal X can be considered to be the multiplier of the product to be provided by the circuit of FIGURE 1. The equation for the relationship between the resistance of cell 11, $R_{11}$, and the applied voltave $V_X$ follows:

$$V_A=\frac{R_{12}}{R_{12}+R_{11}+R_{13}}\cdot 2E-E \quad (1)$$

$$V_X=\frac{R_{17}}{R_{16}}\cdot V_A=KV_A=KE\left(\frac{2R_{12}}{R_{12}+R_{11}+R_{13}}-\ \right) \quad (2)$$

where $R_{16}$, $R_{17}$, $R_{12}$, $R_{13}$ are the resistances of their correspondingly numbered resistors. $V_A$ and $V_X$ are the voltages at terminals A and X.

Referring now to photoconductive cell 11' it is seen that it is also illuminated by lamp 14 and is in a voltage divider circuit comprising series connected resistors 12', 13' and a balanced source of variable voltage $\pm V_Y$ and $\mp V_Y$ at terminal pair Y. Cell 11' is chosen to have its resistance characteristic match as closely as possible that of cell 11. Resistors 12', 13' are equal to resistors 12, 13, respectively. With the input voltages $V_Y$ set to magnitude E and of corresponding polarities, the physical location of cell 11' is adjusted relative lamp 14 so that the voltage at terminal Z is equal to that at terminal A for some selected value of voltage at terminal X, $V_X$, within the allowable range of $V_X$. Since cell 11' is selected to be very similar in its illumination-resistance characteristic to cell 11, $R_{11'}=R_{11}$ for all values of $V_X$. The voltage $V_Z$ at terminal Z is seen by inspection to be $$V_Z=\left(\frac{R_{12'}}{R_{12'}+R_{11'}+R_{13'}}\right)2V_Y-V_Y=V_Y\left(\frac{2R_{12'}}{R_{12'}+R_{11'}+R_{13'}}-1\right) \quad (3)$$

Therefore from Equation 2

$$V_Z=V_Y\cdot\frac{V_X}{KE}=\frac{1}{KE}V_XV_Y$$

It is seen that the circuit of FIGURE 1 provides at its output Z a voltage $V_Z$ which is the product of the multiplier voltage $V_X$ and the multiplicand voltage $V_Y$, as modified by the scale factor KE. For $E=10$ volts and $K=R_{17}/R_{16}=10$, the amplitude of the product voltage $V_Z$ is only $1/100$ of $V_XV_Y$, but this is no problem since subsequent amplification is usually available in circuits to which the product Z is applied as an input. If a smaller range of $V_X$, plus one volt to minus one volt, is acceptable, $R_{16}$ may be made equal to $R_{17}$ and the amplitude of $V_Z$ will then be $1/10$ $V_XV_Y$.

As mentioned previously, the photoconductive cells 11, 11' must be very well matched in resistance over their operating range. The allowable difference $\Delta R$ depends on the desired accuracy of the product and may readily be calculated by using Equations 2 and 3 and assuming $R_{11}=R_{11'}+\Delta R$. The cadmium sulfide cells used in the preferred embodiment of the invention were very well matched over their resistance operating range of 13 to 48 kilohms. A cadmium selenide cell may be used instead of cadmium sulfide but some of its characteristics make it not as suitable in this multiplier application.

The cells 11, 11' may also differ in resistance because of differing temperatures, either ambient or internally generated by power dissipation. Care should be exercised to see that the cells are mounted in good thermal contact with a common heat sink and that the voltage across the cells is kept small to minimize power dissipation. The cadmium sulfide cell is less sensitive to temperature change than the cadmium selenide cell.

The photoconductive cells' resistance is also voltage sensitive. This sensitivity causes the output voltage $V_Z$ to be other than zero when $V_X=0$ and the multiplicand voltage $V_Y$ was varied. This effect was smallest when the illumination on the cell caused the cell to be in its low resistance region. For the cadmium sulfide cell selected for the preferred embodiment and the small voltage change across the cell 11', the change in resistance of cell 11' over the operating range of $V_Y+10$ to $-10$ volts caused only a negligible deviation from $V_Z=0$ when $V_X$ was equal to zero. The cadmium sulfide cell resistance is not as sensitive to voltage across it as the cadmium selenide cell and is, therefore, preferred.

The lamp used as the source of illumination for the cells is chosen on the basis of minimizing the load on the amplifier 15 while still providing the required illumination intensity on each cell 11, 11'. Another characteristic of the lamp 14 which is of importance is its frequency response. It was found that a Chicago Miniature No. 338 lamp rated at 2.7 volts and 0.06 amp was able to be driven by the selected operational amplifier to provide the desired illumination intensity range and frequency response.

Figure 2:
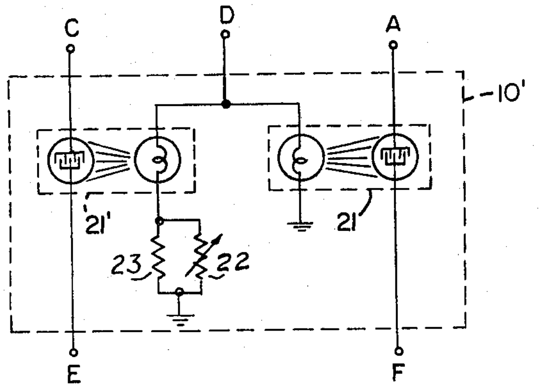
FIGURE 2 is an alternate form of the electro-optics of the multiplier of FIGURE 1.

FIGURE 2 shows an alternate form of the electro-optical circuit 10 of FIGURE 1 wherein separate pairs of a lamp-photoconductive cell units 21, 21' are used instead of the common-lamp arrangement of FIGURE 1. The electro-optical arrangement 10' of FIGURE 2 was used initially because the units 21, 21' were commercially available as Raytheon "Raysistors." However, the presence of another variable, the additional lamp, caused matching to be inferior to that obtained by circuit 10 of FIGURE 1 where only one lamp is used to provide illumination to more than one photoconductive cell. Resistors 22, 23 are used to balance the illumination from the lamps of units 21, 21'. Terminals A, C, D, E and F indicate points to which circuits 10 and 10' are connected.

The multiplier of FIGURE 1 as shown is providing only one product output Z. However, the circuit is intrinsically capable of providing many products $Z=XY$, $Z'=XY'$, $Z''=XY''$, etc. by merely duplicating the "slave" circuitry of FIGURE 1, consisting of resistors $R_{13'}$, $R_{12'}$, and cell 11', and providing individual balanced voltage inputs at terminal pairs Y', Y'', etc. The limit on the number of products which may be obtained by additional "slave" circuits is a physical one imposed by the requirement that each cell 11 receive the same level of illumination from lamp 14.

Figure 3:
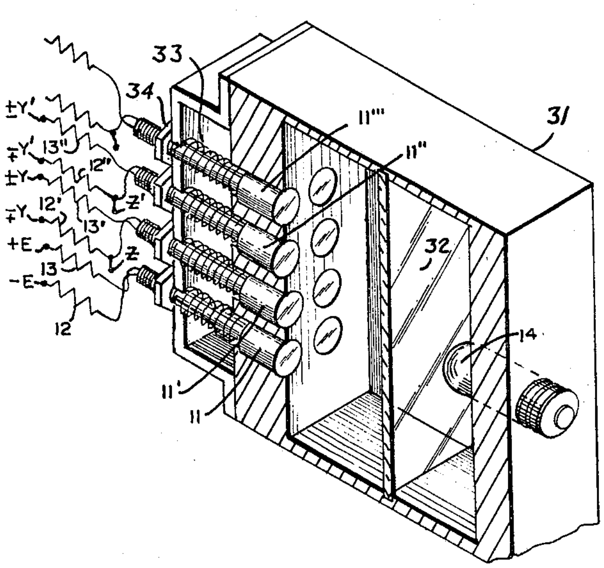
FIGURE 3 is a pictorial representation of an enclosure for uniformly illuminating a large number of photoconductive cells.

FIGURE 3 illustrates a plurality of photoconductor cells 11, 11', 11'' mounted in a light-tight container 31 in which is also contained the light source 14. A light diffuser 32, either of plastic or glass, is placed between the lamp 14 and the photocells 11. The cells 11 are placed close to one another so that they receive substantially the same intensity of illumination. Trimming the intensity of illumination impinging on each cell may be accomplished by several techniques only one of which is shown in FIGURE 3. One way for making each photocell 11 have the same resistance is to mount each diode in a cylindrical hole in the wall of chamber 31 so that it may be moved nearer or farther from the light source 14 in the opposite wall. This movement may be accomplished either by sliding the lamp along the axis of the cylinder or by causing a spring 33 loaded screw nut 34 produce this linear motion. Many other ways of adjusting the light intensity impinging on the diodes 11 will suggest themselves to one skilled in the art, however, the screw adjustment technique was found adequate. In addition, the overall light intensity on cells 11 may be adjusted by longitudinal movement of lamp 14 which is also screwably mounted in the wall of chamber 31.

In order that the light seen by the photocells be distributed uniformly over the surface of the diffuser 32, the distance between the light source 14 and the diffuser 32 must be kept large in comparison with the greatest linear dimension of the source. Placing the diffuser a distance of about five times the physical length of the portion of the lamp exposed to the chamber produced good results. The diffuser was spaced only one-quarter of an inch from the cells. Finally, in order to insure even more complete diffusion of the light inside the enclosure 31, the inside of the enclosure was painted with several coats of a diffusing paint, CE 350 magnesium carbonate distributed by General Electric.

The multiplier circuit of FIGURE 1 is arranged to multiply signals when the analog voltages $V_X$ and $V_Y$ are either positive or negative, i.e., four-quadrant operation. If only two-quadrant operation is desired, for instance $V_X$ inputs always negative, the circuit of FIGURE 1 may be modified by replacing the —E supply by a ground connection. The Y terminal of resistor 12' is also connected to ground, hence only a single ended voltage supply is required for $V_Y$ instead of a balanced supply as in FIGURE 1. In this mode, a much wider range of photocell resistances must be utilized for effective operation. It should be noted that the quarter square multiplier must generate internally the complements of applied signals (or perform an equivalent operation) in order to multiply regardless of whether two or four quadrant products are desired. In the photoresistive multiplier of this invention, two quadrant multiplication requires only a single multiplicand and a single multiplier input signal, hence the extra inverting amplifiers of the quarter-square multiplier can be eliminated.

Although the preferred embodiment of the invention has been described in terms of an incandescent lamp providing illumination to a photoconductive cell, it is apparent that other sources of radiant energy and cells whose resistance depends upon the intensity of such radiation will also function. Frequency response may be increased by using electroluminescent panels instead of incandescent lamps as a light source. The panels are not directly interchangeable with incandescent lamps since they operate on A.C., require high voltage at low current and their light output depends upon the frequency of the A.C. voltage. Engineering skill is required to adapt the electro-luminescent panel to this type of multiplier.

An earlier version of the comparison circuit of FIGURE 1 was provided by applying voltages $V_A$ and $V_X$ directly to terminals 18, 110, respectively, of amplifier 15 without using resistors 16, 17. Since amplifier 15 amplifies the difference in voltage at its input terminals, $V_A$ and $V_X$ must be nearly equal and of the same polarity as contrasted to the circuit of FIGURE 1 where they are of opposite polarity. The polarities of the voltage sources E must be reversed when $V_A$ and $V_X$ are directly applied to terminals 18, 110, respectively.

Although only a preferred embodiment of this invention has been described, it is apparent to those skilled in the art that many modifications other than those briefly described may be made in the circuitry without departing from the spirit and scope of the invention.

Having thus described the invention, I claim:

1. An analog multiplier comprising
a first and second variable resistance element,
a single concentrated incandescent source of radiant energy impinging on said first and second resistance elements, means for isolating said elements from extraneous radiant energy, the resistance of each element being substantially equal and dependent upon the intensity of said radiant energy,
a first and second electrical network including said first and second variable resistance elements respectively,
a source of constant voltage applied to the input terminals of said first network,
said first and second network each having an output terminal to provide an output voltage responsive to its input voltage and to the resistance of its variable resistance element,
a first signal voltage,
means for amplifying the difference of said first signal voltage and said first network output voltage to provide an energization voltage to said energy source whose magnitude is dependent upon the magnitude of said first signal voltage, the intensity of radiant energy from said source being dependent upon its energization voltage,
a second signal voltage applied to the input terminals of said second network,
the voltage at said second network output terminal being proportional to the product of said first and second voltages.

2. The multiplier as in claim 1 comprising in addition
a heat sink,
means for mounting said variable resistance elements in good thermal contact with said heat sink to maintain the temperature of each resistance element the same as each other resistance element,
said variable resistance elements being separated from said incandescent source by an air space.

3. The multiplier of claim 1 comprising in addition
a light-tight enclosure,
said resistance elements and said incandescent source are mounted in said enclosure to provide illumination of said elements by said source while preventing extraneous radiant energy from impinging on said elements,
means for individually adjusting the amount of light from said source impinging upon each element.

4. The multiplier of claim 3 comprising in addition a light diffuser placed in said air space between said resistance elements and said incandescent source.

5. The multiplier of claim 1 wherein
said source of constant voltage energizing said first network comprises separate positive and negative voltage sources with respect to ground potential,
said input terminals of said first network comprising an input terminal to which said positive voltage source is connected and a separate input terminal to which said negative voltage source is connected, said output voltage from said first network being positive or negative depending upon the polarity of said first signal, said second signal voltage is a balanced signal voltage with respect to ground, said input terminals of said second network comprising an input terminal to which one output of said balanced signal voltage is connected and a separate input terminal to which the other output of said balanced signal voltage is connected, the output voltage of said second network being the algebraic product of said first and second input signals.

References Cited

UNITED STATES PATENTS

| | | | |
|---|---|---|---|
| 3,082,381 | 3/1963 | Morrill et al. | |
| 3,193,672 | 7/1965 | Azgapetian | 235—194 |
| 3,283,135 | 11/1966 | Sklaroff | 235—194 |

MALCOLM A. MORRISON, *Primary Examiner.*

J. F. RUGGIERO, *Assistant Examiner.*